US008821979B2

(12) United States Patent
van Mil et al.

(10) Patent No.: US 8,821,979 B2
(45) Date of Patent: Sep. 2, 2014

(54) IN-LINE PRINTING PROCESS ON WET NON-WOVEN FABRIC AND PRODUCTS THEREOF

(75) Inventors: Jan van Mil, Givat Nili (IL); Ron Broshi, Gealya (IL)

(73) Assignee: N. R. Spuntech Industries Ltd., Upper Tiberias (IL)

( * ) Notice: Subject to any disclaimer, the term of this patent is extended or adjusted under 35 U.S.C. 154(b) by 0 days.

(21) Appl. No.: 13/270,364

(22) Filed: Oct. 11, 2011

(65) Prior Publication Data

US 2012/0094091 A1 Apr. 19, 2012

Related U.S. Application Data

(60) Provisional application No. 61/394,407, filed on Oct. 19, 2010.

(51) Int. Cl.

| | |
|---|---|
| ***B41M 1/12*** | (2006.01) |
| ***C09D 17/00*** | (2006.01) |
| ***D06P 5/00*** | (2006.01) |
| ***D06P 1/52*** | (2006.01) |
| ***D06M 23/04*** | (2006.01) |
| ***D04H 1/66*** | (2012.01) |
| ***D06P 1/44*** | (2006.01) |
| ***A47L 13/16*** | (2006.01) |
| ***C11D 17/04*** | (2006.01) |
| ***D06M 15/31*** | (2006.01) |
| ***D06M 23/16*** | (2006.01) |
| ***D06M 15/233*** | (2006.01) |
| ***D06M 23/12*** | (2006.01) |
| ***D06M 15/263*** | (2006.01) |
| ***D06P 1/14*** | (2006.01) |
| ***D06M 15/227*** | (2006.01) |

(52) U.S. Cl.

CPC ............ *D06M 15/227* (2013.01); *D06P 5/001* (2013.01); *D06M 23/04* (2013.01); *D06P 1/5257* (2013.01); *D04H 1/66* (2013.01); *D06P 1/44* (2013.01); *D06P 1/5221* (2013.01); *A47L 13/16* (2013.01); *C11D 17/049* (2013.01); *D06M 15/31* (2013.01); *D06M 23/16* (2013.01); *D06M 15/233* (2013.01); *D06M 23/12* (2013.01); *D06P 1/5242* (2013.01); *D06M 15/263* (2013.01); *D06P 1/14* (2013.01); *D06P 1/525* (2013.01)

USPC .......... 427/288; 427/265; 525/218; 525/228; 525/238

(58) Field of Classification Search

CPC ............ D06Q 1/14; D04H 1/66; C09D 11/10
USPC .................. 525/218, 228, 238; 427/265, 288
See application file for complete search history.

(56) References Cited

U.S. PATENT DOCUMENTS

| | | | |
|---|---|---|---|
| 3,615,972 | A | 10/1971 | Morehouse, Jr. et al. |
| 4,006,273 | A | 2/1977 | Wolinski |

(Continued)

FOREIGN PATENT DOCUMENTS

| | | | | |
|---|---|---|---|---|
| DE | 19851878 | | | 5/2000 |
| JP | 62028481 | A | * | 2/1987 |
| WO | 2004/071780 | | | 8/2004 |

OTHER PUBLICATIONS

Gilleo (Rheology and Surface Chemistry for Screen Printing. Screen Printing. Feb. 1989. pp. 126-132).*

(Continued)

*Primary Examiner* — Brieann R Fink

(74) *Attorney, Agent, or Firm* — Roach Brown McCarthy & Gruber, P.C.; Kevin D. McCarthy

(57) ABSTRACT

A process for manufacturing a non-woven fabric having on its surface distributed elements having a physical dimension, comprises screen printing on wet fabric a desired shape using a paste that expands under heating by virtue of a puffing agent contained therein.

11 Claims, 11 Drawing Sheets

(56) References Cited

U.S. PATENT DOCUMENTS

| | | | | |
|---|---|---|---|---|
| 4,044,176 | A * | 8/1977 | Wolinski et al. | 427/256 |
| 4,280,888 | A * | 7/1981 | Bush et al. | 522/81 |
| 4,818,583 | A | 4/1989 | Geel | |
| 5,213,588 | A | 5/1993 | Wong | |
| 5,360,826 | A | 11/1994 | Egolf et al. | |
| 5,462,768 | A * | 10/1995 | Adkins et al. | 427/265 |
| 5,474,719 | A | 12/1995 | Fan et al. | |
| 6,737,114 | B2 * | 5/2004 | Dawson et al. | 427/282 |
| 7,294,363 | B2 * | 11/2007 | Grove et al. | 427/407.1 |
| 2002/0142106 | A1 | 10/2002 | Bethune et al. | |
| 2002/0197288 | A1 | 12/2002 | Chevalier | |
| 2003/0198746 | A1 | 10/2003 | Dawson | |
| 2003/0228813 | A1 | 12/2003 | Johnson | |
| 2004/0123963 | A1 | 7/2004 | Chen et al. | |
| 2005/0064099 | A1 * | 3/2005 | Berenstain et al. | 427/258 |
| 2006/0057291 | A1 * | 3/2006 | Duris et al. | 427/372.2 |
| 2006/0057365 | A1 | 3/2006 | Swoboda et al. | |
| 2006/0093570 | A1 | 5/2006 | Duddington et al. | |
| 2007/0163454 | A1 | 7/2007 | Orlandi et al. | |
| 2009/0071396 | A1 | 3/2009 | Shvartzman et al. | |
| 2009/0209156 | A1 | 8/2009 | Pedoja | |
| 2010/0048750 | A1 | 2/2010 | Blom et al. | |
| 2010/0221203 | A1 | 9/2010 | Choisy et al. | |

OTHER PUBLICATIONS

Japanese Abstract of JP 62-028481 (Feb. 1987).*
ISR for PCT/IL11/00811, four pages, mailed May 8, 2012.
Written Opinion for PCT/IL11/00811, six pages, mailed May 8, 2012.
Communication from a foreign patent office in a counterpart foreign application, mailed Jun. 7, 2013, 9 pages.
European search report from a foreign patent office in a counterpart foreign application, mailed Jun. 7, 2013 (9 pages).
Communication from a foreign patent office in a counterpart foreign application, mailed Jun. 9, 2014, 10 pages.

* cited by examiner

IN-LINE PRINTING PROCESS ON WET NON-WOVEN FABRIC AND PRODUCTS THEREOF

REFERENCE TO CO-PENDING APPLICATIONS

This application claims priority to U.S. provisional patent application Ser. No. 61/394,407, filed on Oct. 19, 2010.

FIELD OF THE INVENTION

The invention relates to non-woven fabrics. More particularly, the invention relates to the formation of solid elements onto the fabric that provide specific physical characteristics and properties to the non woven material. In particular, the invention provides the ability to control the physical properties of these solid elements according to need.

BACKGROUND OF THE INVENTION

Non-woven fabrics are very common in a variety of uses, ranging from cosmetic tissues to industrial applications. For cleaning purposes, non-woven fabrics are used in all applications, from gentle cosmetic wipes to robust industrial cleaning materials. Such Non-woven fabrics can be manufactured in different ways, and one of the industrially efficient processes employed for this purpose is known in the art as "Spunlace". Spunlace, or Hydro-entanglement, is a technology that uses water jets to cause the entanglement of fibers and thus the formation of the fabric. In this it is unique among the non-woven technologies. The main consequence of the hydro-entanglement technique is the fact that the fabric at the end of its creation step is wet and will require a drying step.

To enhance the cleaning operation to be performed, be it gentle cosmetic cleaning or strong industrial cleaning, it is desirable to add solid physical elements to the surface of the fabric, which will enhance the desired cleaning operation. These solid elements may be of an abrasive nature, with varying degrees of abrasiveness: for the purpose of household cleaning, with low level of abrasiveness, and for industrial cleaning purposes, with higher level of abrasiveness, whereby in both cases, the abrasive nature of the fabric is derived both from the solid elements as well as from the fact that they are raised above the surface. These solid elements may consist, in one instance, of soft, raised shapes, which through their raised position and solid consistency are suitable as a soft abrasive material for cosmetic purposes, i.e., exfoliation. The soft raised elements, when larger in size than desired for soft abrasive purposes, may also have application as non-slip surfaces. In addition, the technique may be employed for the formation of esthetically appealing patterns onto fabric, for decorative purposes.

It is known in the art to provide abrasive elements by creating them on the finished, dry non-woven fabric. As will known to person skilled in the art, there is also no limitation regarding the shape of the abrasive elements, which may be simple dots or may consist of more complex shapes. The degree of abrasiveness depends on the type of material of which the elements are made (e.g., hard or soft polymer), as well as from the density of such elements on the surface (i.e., the fraction of the fabric's surface that is covered by them), their shape and their height.

U.S. Pat. No. 5,213,588 relates to an abrasive wiping article and process for its preparation, which involves printing a pattern on a non-woven substrate to create an abrasive product.

DE 19851878 teaches the preparation of a cleaning article consisting of a non-woven substrate with polymeric particles distributed thereon.

Other ways to create products of this type involve the application of abrasive elements to a finished fabric. However, creating such abrasive surfaces is expensive because of the need to post-process the non-woven fabric at the end of its manufacturing line. Furthermore, due to the nature of the applied solid elements, the amount of material that is required to be deposited in order to obtain the required physical effects is substantial, making the process not economically viable. This fact has so far severely limited the usefulness of such fabrics.

It would therefore be highly desirable to provide a process for manufacturing non-woven fabrics provided with sparse elements of physical consistency on their surface, without the need for expensive and time-consuming post-processing operations.

It is an object of the present invention to provide an in-line process for the manufacturing of such improved fabrics, with control over both the abrasiveness and the pattern height and overcomes the drawbacks of the priori art.

It is a further object of the invention to provide a process, whereby only small amounts of the abrasive material are deposited, while retaining control over the level of abrasive properties, be it strong abrasive for cleaning purposes or soft abrasive for cosmetic exfoliating.

It is yet another object of the invention to provide a process which imparts chemical stability to the solid elements after deposition.

It is still another object of the invention to provide an in-line process that does not require off-line processes or additional elements in the process, while retaining speed and ease of manufacturing operation.

It is still a further object of the invention to provide finished fabrics of high-quality, improved by the addition of elements of physical consistency on their surface.

It is yet another object of the invention to provide materials suitable to be applied to non-woven fabrics in an in-line process to create solid elements on its surface.

Other objects and advantages of the invention will become apparent as the description proceeds.

SUMMARY OF THE INVENTION

The invention, in one aspect, relates to a process for manufacturing a non-woven fabric having on its surface distributed elements having a physical dimension, comprising screen printing on wet fabric a desired shape using a paste that expands under heating by virtue of a puffing agent contained therein.

In another aspect, the invention is directed to a paste suitable for carrying out the process of the invention, comprising a puffing agent.

According to an embodiment of the invention the paste contains a rheology modifier and has a viscosity at high shear which is low such that it allows the transport of the ink through the printing unit and delivery to the printer and its movement through the printing screen, and a viscosity at low shear which is sufficiently high such as to prevent material of the formulation which has been deposited from flowing either into the fabric or sideways.

In one embodiment, the paste has a low shear viscosity, measured with a Brookfield rotary viscometer at speed of 1 rpm, of from 60,000-120,000 cP, preferably from 70,000-90,000 cP, and a high shear viscosity, measured with a Brookfield rotary viscometer at speed of 100 rpm, of below 2,000 cP. In another embodiment the paste has a medium shear viscosity, measured with a Brookfield rotary viscometer at 60 rpm, of from 1,500 to 5,000 cP, preferably from 2,000 to 4,500 cP.

Typically, the paste contains a surface tension modifier and a cross-linking agent.

According to an embodiment of the invention the paste contains a total concentration of solid material of 15 to 45 wt %.

The paste of the invention is characterized by a shape stability defined by a period of at least 5 minutes during which a drop of 1 $cm^3$ of paste dropped into 100 ml of water with no stirring maintains its integrity.

The invention also encompasses a fabric manufactured by the process of the invention, such as a fabric comprising abrasive or exfoliating elements on its surface, which are made of the paste of the invention.

DETAILED DESCRIPTION OF THE INVENTION

Figure 1A:
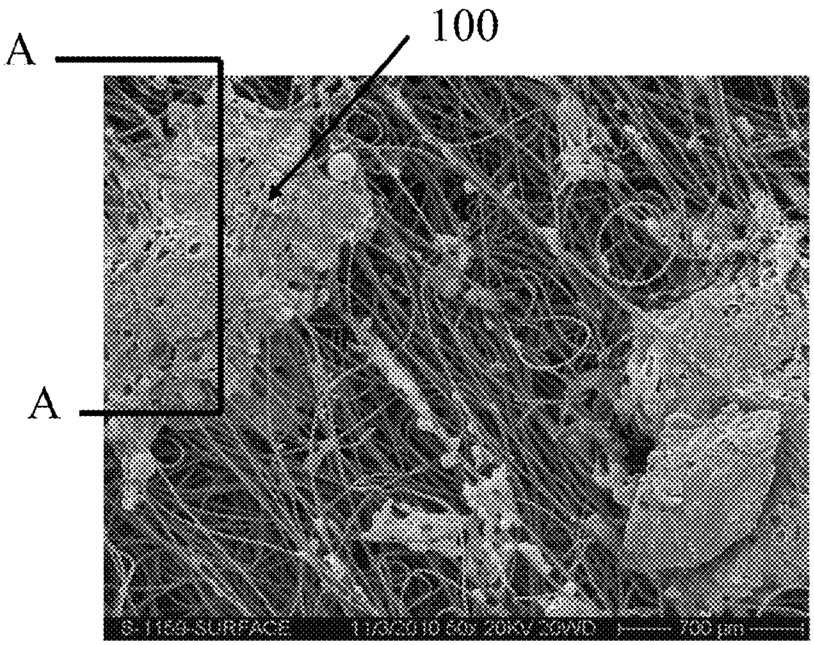
FIG. 1 (A through D) is an EMS (Electron Microscope Scan) of the surface of a "dot" that was created on the surface of a non-woven fabric, shown at different magnifications, as indicated in each figure.
Figure 1B:
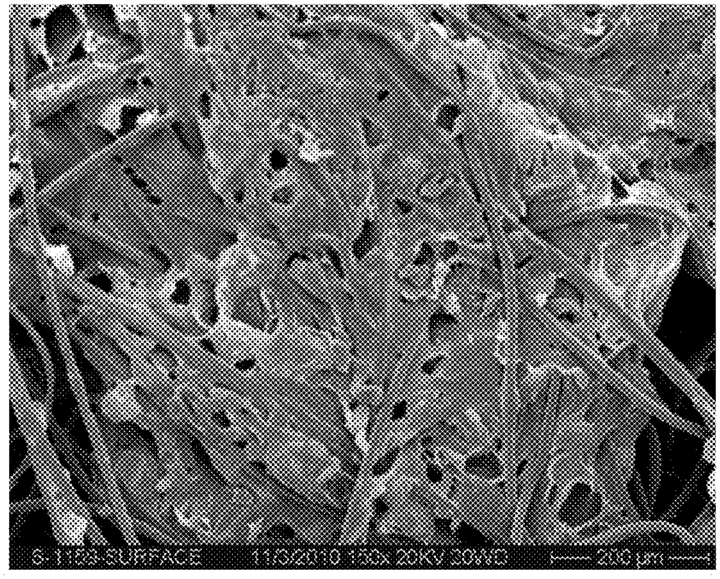
Figure 1C:
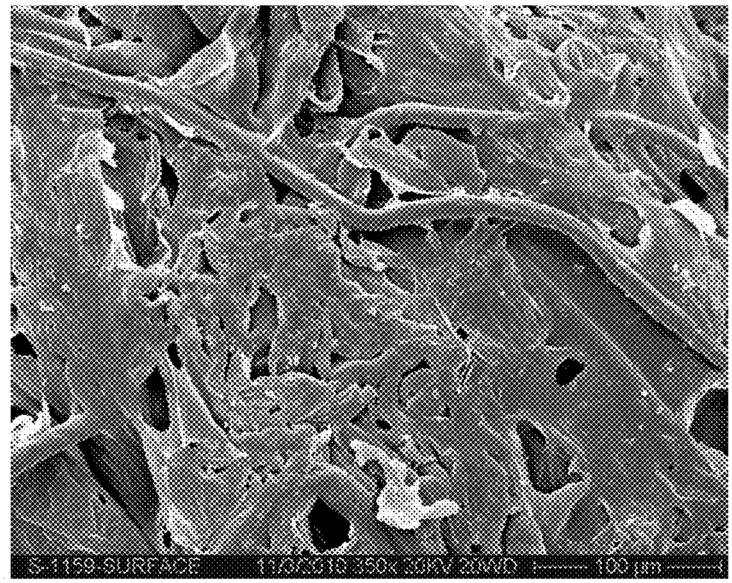
Figure 1D:
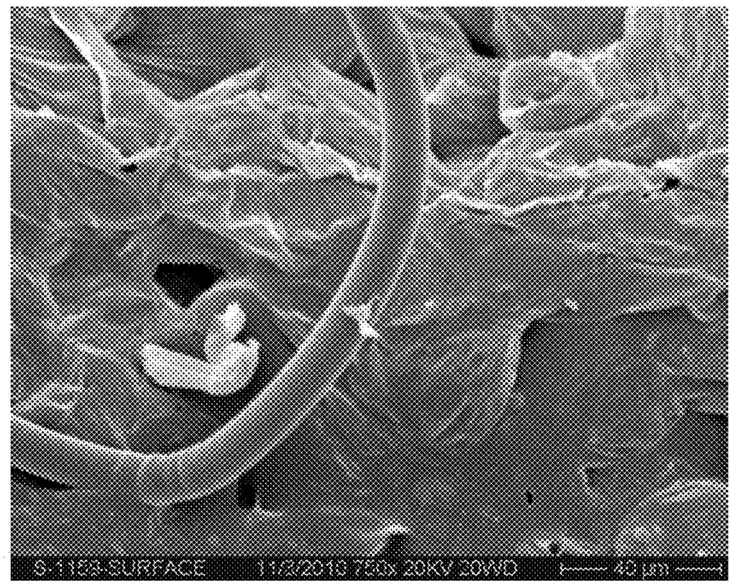
Figure 2A:
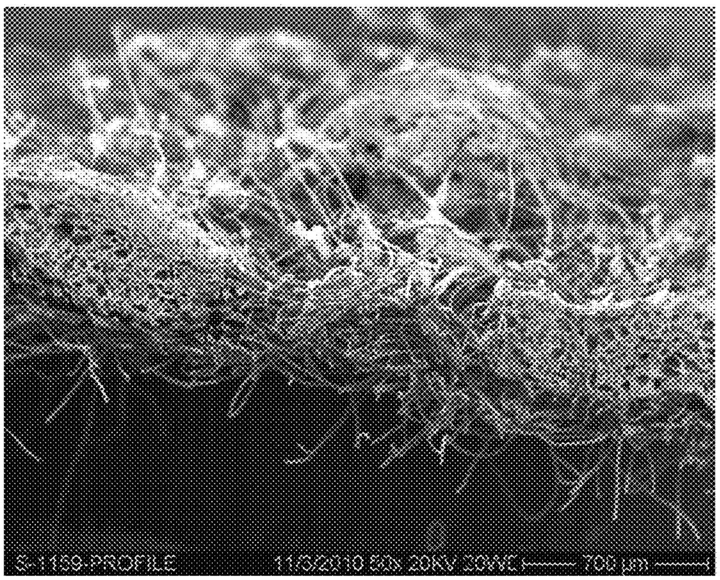
FIG. 2 (A through D) is an EMS of the cross-section of the dot of FIG. 1, taken at different magnifications, as indicated in each figure.
Figure 2B:
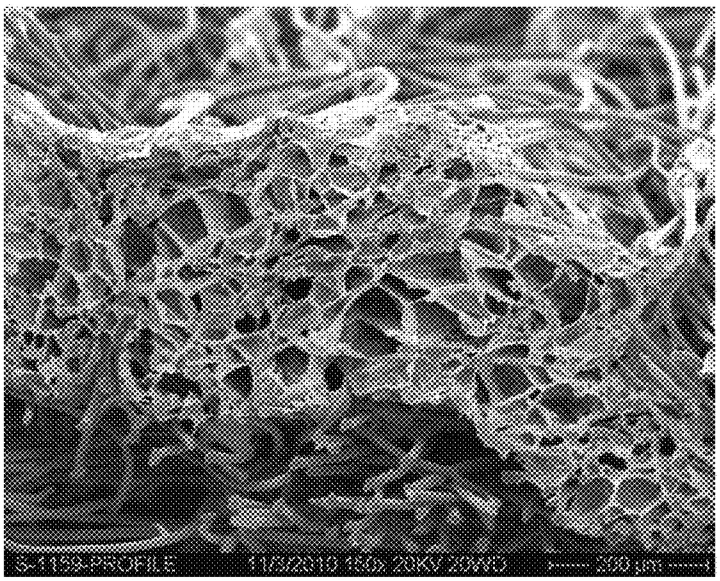
Figure 2C:
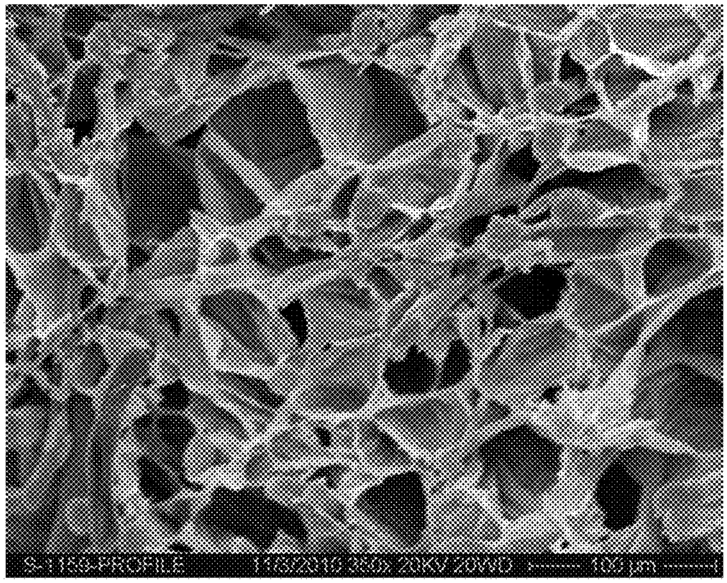
Figure 2D:
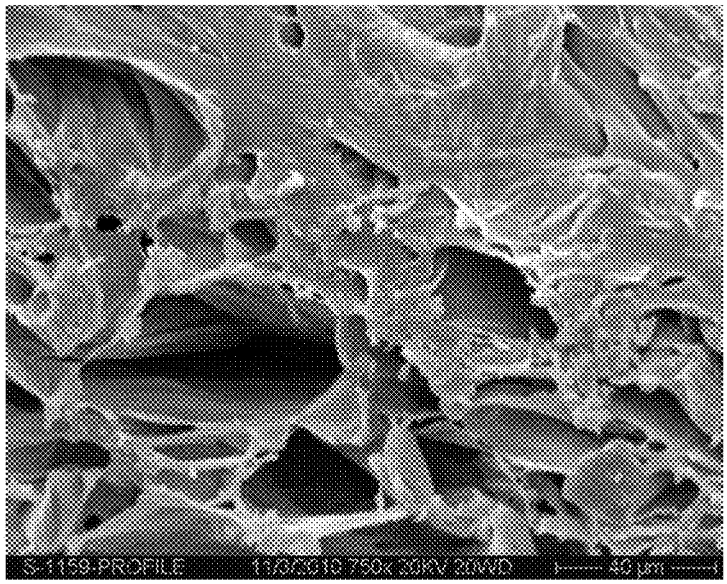
Figure 3A:
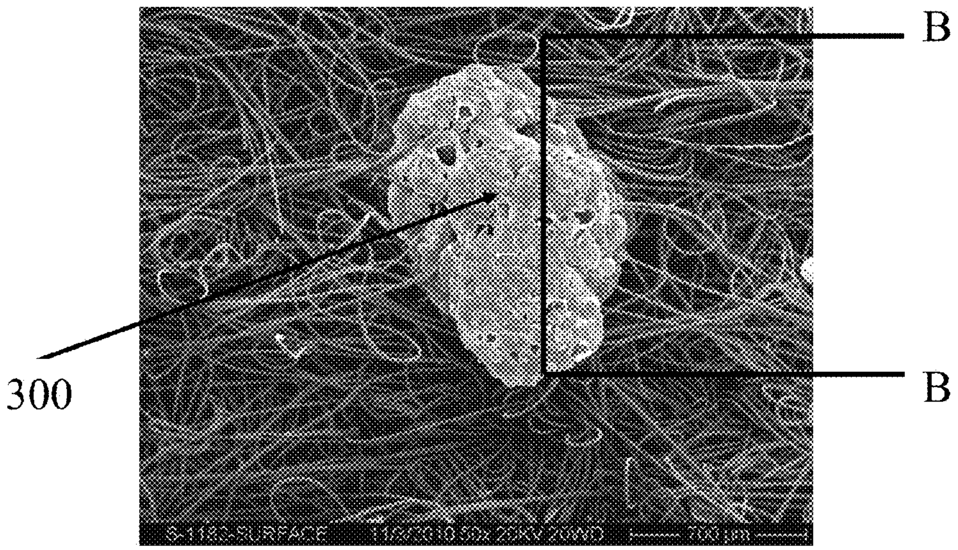
FIG. 3 (A through D) is an EMS of the surface of another "dot" that was created on the surface of a non-woven fabric, shown at different magnifications, as indicated in each figure.
Figure 3B:
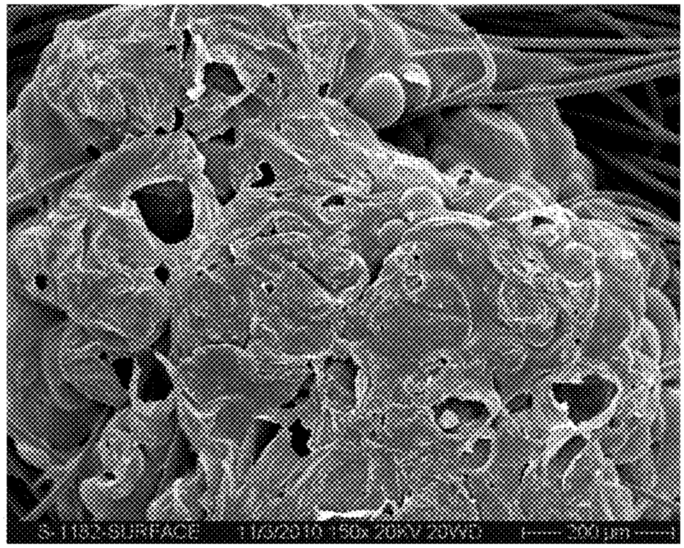
Figure 3C:
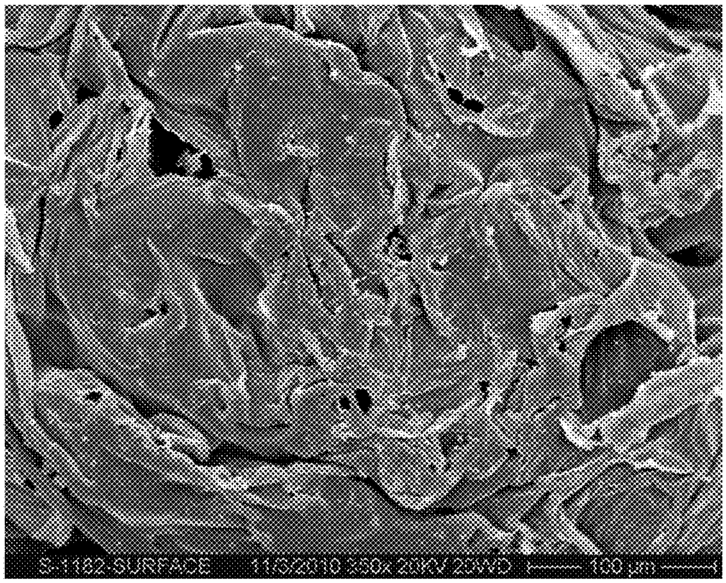
Figure 3D:
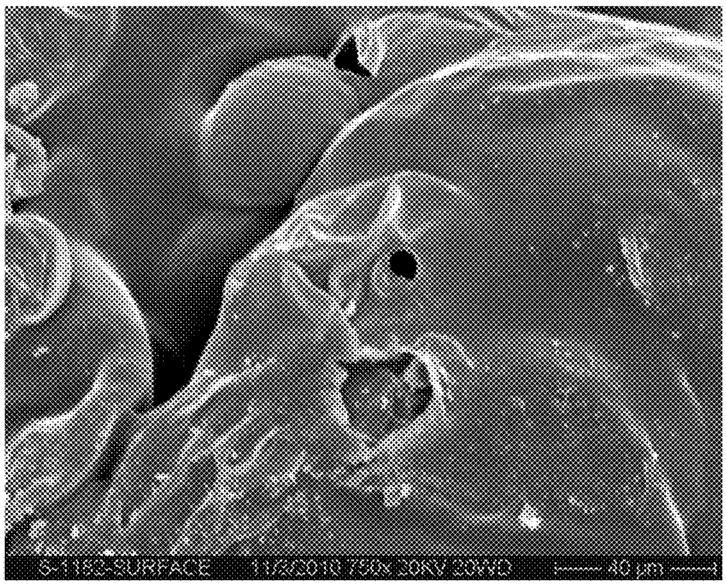
Figure 4A:
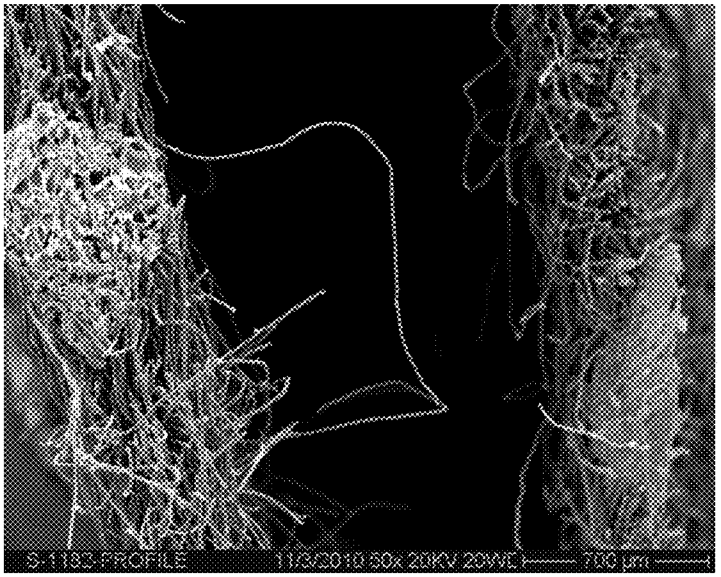
FIG. 4 (A through D) is an EMS of the cross-section of the dot of FIG. 3, taken at different magnifications, as indicated in each figure.
Figure 4B:
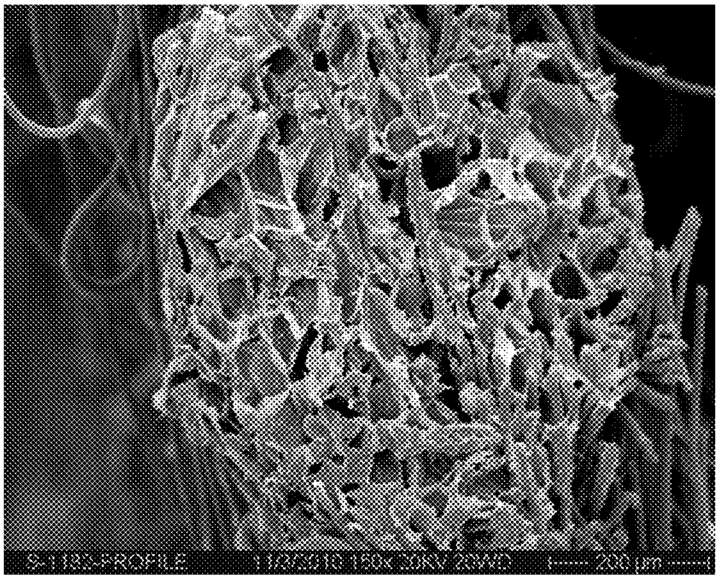
Figure 4C:
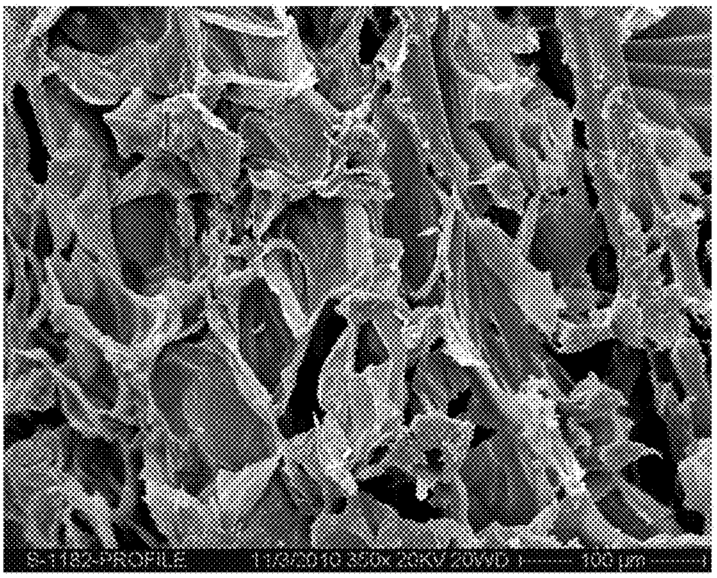
Figure 4D:
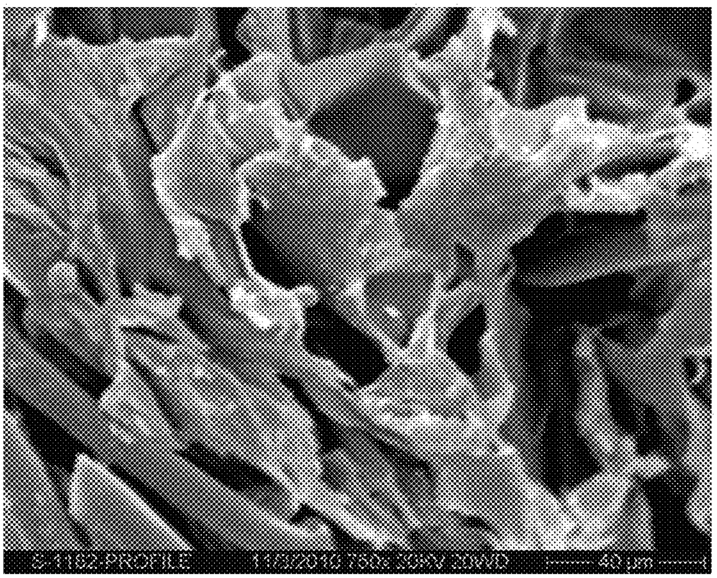

In the description to follow and for the sake of brevity, the process of creating one or more elements of physical consistency on the surface of a non-woven fabric will be referred to as "printing", it being understood that the term is mainly used as an abbreviation and is not intended to limit the invention in any way to any process or apparatus involved in conventional printing techniques or related methods for the deposition of solid elements.

By "physical consistency" it is meant to indicate that the elements are not mere decorative printing, but have a volume of their own, which extends above the plane of the fabric surface. Likewise, again for the sake of brevity, the elements having physical consistency that are provided on the surface of the fabric will be referred to hereinafter in some cases as "dots", regardless of their actual shape, it being understood that the definition encompasses any shape and form of said elements. Finally, the materials of which said "dots" are made will be referred to hereinafter as "paste" or, interchangeably, as "ink", once again to simplify and streamline the description to follow, it being understood that said reference does not imply any limitation to the type of material employed.

The present invention provides a process for the manufacture of a non woven fabric with abrasive properties of varying level for the purpose of cleaning, from gentle cosmetic cleansing to household cleaning and beyond. The abrasive nature is imparted to the fabrics through the deposition of raised solid elements ("dots") and the invention provides methods for determining the abrasive properties of the fabric, by controlling parameters such as but not limited to dot height, dot size, dot surface density, and dot composition. The dot height may be controlled through a number of factors, both from the manufacturing technology as well as from the printing ink composition. The dot size may be controlled by simple physical parameters of the printing process such as the pore size of the printing screen used. In addition, and more importantly, the dot size is controlled through manufacturing parameters (such as drying temperature profile) and printing ink composition and properties (such as rheology). The number of dots per surface unit (dots surface density) is controlled through the choice of the printing screen mesh and the abrasive level through manufacturing technology factors (such as drying temperature profile) and printing ink composition. The control over all these parameters is obtained through the properties of the printing ink and through the manufacturing process, including the solid content of the ink, the drying profile, the rheology profile and thixotropy of the ink, the wettability of the ink, and the properties of the puff components. By controlling these parameters, several lines of products may be obtained, from an abrasive product used for household and industrial cleaning having a high degree of abrasiveness, to a softer product suitable for cosmetic cleaning, skin exfoliation.

The fabric is a non woven material, which in the examples described below is one that is manufactured by the hydroentanglement technique and may consist of different fiber compositions, i.e., a combination of absorbing fibers such as rayon and cotton, and non-absorbing fibers such as PET and PP. As will be appreciated by the skilled person, the compositions mentioned herein are given for illustrative purposes only and are not meant to limit the invention in any way, it being understood that any suitable fiber or applicable fiber mix—as well as any suitable manufacturing process—that can be used to manufacture non-woven fabric can be used, mutatis mutandis. According to one embodiment of the invention the product is a spunlace non woven fabric with end-uses such as cosmetic exfoliating, general cleaning, anti-slip, etc. The fabric in these examples is a standard Spunlace non woven material, of varying fiber mix, weight and other general physical properties, manufactured by N. R. Spuntech Industries Ltd., Israel, for a variety of end-use applications.

The material that is applied to the non-woven fabric to create the protrusions will be termed hereinafter "paste formulation" or "ink", for the sake of brevity. A detailed discussion of the paste formulations below, will illustrate the components of the formulation. Since the product is destined for various end-uses, the properties of the material that extends from the surface of the fabric must be variable and controllable. This is an important advantage of the invention, which allows flexibility in manufacturing. The most important parameters are: dot height, dot size (circumference, if rounded, or other suitable dimension for non-circular shapes), abrasive level, penetration into the fabric, dot density per surface units.

The paste formulations suitable to be used in the present invention have the following common characteristics:

a. They are all water-based;
b. They all contain polymer as basis material. This polymer may be chosen from a wide variety of thermoplastic materials, including Polyacrylate; polyurethane, polyesters etc.
c. They all contain a puffing agent, material suitable to "puff" up the protrusion, e.g., a dot, after they are deposited. This puffing agent consists of microcapsules (made of thermoplastic material such as acrylate,) containing alkane gas, e.g., isobutane. The microcapsules, when heated, swell by expansion of the contained gas (and the extended form is maintained after cooling), and when dispersed in a formulation containing thermoplastic polymer they cause the protrusion to increase significantly in size as long as the thermoplastic polymer in the formulation retains its integrity and expands together with the expanding microcapsules. The degree of size increase is dependent on the amount of puffing agent added, the thermoplastic properties of the polymer and the temperature to which the assembly is raised after formation and the skilled person will easily devise the formulation that meets his specific requirements. Puff microcapsules with varying temperature ranges of swelling are available in the market and are well known to persons skilled in the art;

d. They all contain rheology modifiers which are crucial for obtaining the correct rheological behavior of the ink formulation during the various stages of the process. Rheology control is of great importance for obtaining the physical elements with the desired properties. Major requirements:
   1. The viscosity at medium shear levels should be such that the formulation may be handled and transported with ease without the need for special equipment;
   2. The viscosity at high shear should be low to an extent that allows the transport of the ink through the printing unit and delivery to the printer and its movement through the printing screen;
   3. The viscosity at low shear should be sufficiently high to prevent material of the formulation which has been deposited from flowing either into the fabric or sideways. The behavior described above, which in expert terms is called "thixotropy", is an important element of the invention. Representative appropriate viscosity levels are: Low shear (measured with a Brookfield rotary viscometer at speed of 1 rpm): from 60,000-120,000 cP, and preferably from 70,000-90,000 cP; High shear (measured with a Brookfield rotary viscometer at speed of 100 rpm): below 2,000 cP; and medium shear (measured with a Brookfield rotary viscometer at 60 rpm); from 1,500 to 5,000 cP, preferably from 2,000 to 4,500 cP.

e. They all contain additives to modify the surface tension of the deposited physical element. The surface tension, when sufficiently high, prevents a bead or line or any other shape forming the physical element, after deposit but before temperature is applied to be diluted and dissolved into the water that is present in the basis fabric as a result of the spunlace process. The amount of water present in the basis fabric may vary (depending on the process parameters and the fiber composition of the fabric) and typically ranges from 50-80% of the dry fabric weight, to 100-200% of the dry fabric weight.

f. They all contain a crosslinking agent to allow accelerated crosslinking of the polymer employed as well as crosslinking to the fabric for additional stability of the physical elements on the fabric.

g. Optionally, they may all contain colorants or other esthetic enhancing materials depending on the application and the desire of the end user.

h. They are all formulation in a concentration of 15-45 wt % solid material, wherein the mount of solid material depends on the intended application.

A number of properties of the printing paste determine the behavior of the paste before, during and after printing, and control over these properties will allow control over the properties of the final dots. The main properties that need to be controlled for the process to proceed properly are:

a. the solid content;
b. the rheology profile and thixotropy;
c. the wettability;
d. the polymer and filler properties; and
e. the puff component properties.

The solid content of the paste formulation directly influences the amount of water that needs to be removed from the physical element during the drying process and thus the amount of energy required to remove this water. The amount of solids in the ink also determines the "Add-On" during printing, i.e., the amount of wet paste the printing machine transfers to the fabric in order to reach the required amount of solids on the fabric. This determines the maximum amount of solids that may be transferred to the fabric at a given speed and thus is a limiting factor on the speed of the manufacturing process. For applications where a larger amount of solid element needs to be deposited, a higher solid content is preferably used. As said, typical solid contents will be in the range of 15-45% by weight whereby the application and the percent coverage of the physical element on the fabric will determine the optimum solid content. For physical elements with a higher coverage, a higher solid content is desirable to be able to maintain production parameters such as speed, abrasive level and cost.

The rheology profile of the printing ink, when moving through the printer, flowing through the screen and being deposited on the fabric, is important for obtaining the required properties of the final printed and dried dot. The basic ink formulation itself is already thixotropic and its thixotropic behavior may be enhanced still through the use of additives. While being pumped from the holding vessel to the screen, the pump pressure keeps the viscosity sufficiently low to allow unhindered, essentially laminar flow and also the exit through the pores of the screen is facilitated by this low viscosity at high shear. Once the ink reaches the fabric, and no pressure is exerted any longer, the viscosity (which is now at very low shear), increases significantly, and this steadies the printed dot on the fabric and minimizes both lateral flow as well as penetration into the fabric. Since the thixotropic behavior of the ink dictates both the high and low shear viscosity, as well as the gap between them, the optimum values need to be determined experimentally. Indeed the viscosity of the printing ink at various stages of the printing process determines the characteristics of the dots in the following manner:

1. High Shear Viscosity

The ink must be able to flow freely through the printing unit and into the squeegee system under the pressure of the pump which supplies the ink to the printing unit. In order to enable this flow, the high-shear viscosity of the ink should be sufficiently low (1,000-2,000 cP at 100 rpm in Brookfield viscometer). The high-shear viscosity should not be too high to prevent clogging of the printing system, in particular the squeegee.

2. Low-Shear Viscosity

After the ink exits the printing screen and is deposited onto the fabric as a dot, no forces are exerted on it and the flow properties of the ink may cause both the penetration of the ink into the fabric (thereby reducing the height of the final printed dot as well as causing the dot to protrude from the backside of the fabric) as well as the lateral flow of the ink (which would also reduce the height of the final printed dot and, through the sideways flow also its size). An increase in low-shear viscosity will limit these effects. However, too high a low-shear viscosity (above ~90,000 cP at 1 rpm by Brookfield viscometer) will prevent the proper deposition of the ink onto the fabric and cause reduction in height and lower attachment. To overcome the issues described above, the ink is engineered to be thixotropic in nature with defined low- and high-shear viscosities.

The printing paste formulation according to the invention is a stable water-based emulsion of polymeric material and additives. Since printing is done on wet fabric, the contact of the paste with the wet fabric would immediately result in dilution of the printing paste, which would induce changes in the rheology behavior and flow of the printed material. To prevent this problem the wettability of the printing paste is controlled by using additives suitable to increase the surface tension of the wet dot surface to a level that mixing shear is required to "dilute" the wet printed dot and very little mixing of the printed paste with the water in the fabric occurs.

The puffing agent is added to the formulation in an amount sufficient to increase the size of the physical element (i.e., of the final protrusion) to the desired level. The control over the size increase is obtained through the energy supplied to the solid element (through the dryer temperature).

Specific paste formulations are employed according to the intended purpose of the fabrics. One example of paste formulation used in an embodiment of the fabric of the invention for housing and industrial cleaning purposes, wherein high abrasiveness degree is required, comprises a basis polymeric material, such as polyacrylate, polyurethane or other appropriate; a rheology modifier; a puffing agent; a chemical to control surface tensions; a colorant; an inorganic filler; a crosslinking agent; and water. Another example of paste formulations, used in an embodiment of the fabric of the invention for cosmetics, comprises a basis polymeric material, such as polyacrylate, polyurethane or other appropriate; a rheology modifier; a puffing agent; a chemical to control surface tensions; a colorant; a fixating agent; and water.

Test Method for Establishing the Amount of Surface Active Agents Required in the Formulation.

The presence of surface active agents in the formulation is required to retain the integrity of the dot after printing onto wet fabric. The formulation contains 60% of water, but the surface active agents should prevent the mixing of the formulation with the water on the printing surface (water contained in the fabric, which may reach 200% by weight of the fabric).

A wide variety of surface active agents may be used and a simple test may be performed to establish the efficacy of the agent employed. A quantity of 1 $cm^3$ of printing ink is dropped in 100 ml of water without stirring. If the drop retains its integrity at least for a period of 5 minutes (without stirring), the surface active agents are sufficient for the purposes of the invention, to prevent the mixing of the formulation with the water in the printing surface to any large extent.

General Manufacturing Procedure

In one embodiment of the invention, printing of the paste formulation on the fabric is performed by using the In-Line Printing technology described in WO2004/071780 of the same applicant herein, although alternative systems may be employed. In this particular embodiment of the invention printing is done using a standard screen Printer (Stork BV, Holland), which is placed in the spunlace manufacturing line behind the water removing suction boxes and before the fabric reaches the dryers (i.e., the printing is done on fabric that is still wet), as described in the aforementioned WO2004/071780. The ink formulation dictates its behavior before reaching the fabric, during deposition on the fabric and after deposition and before drying. The physical element, whether it is a dot, a line or any other type of pattern, is printed onto the wet fabric and the printed fabric is transferred into the dryer.

The fabric with the printed physical element may be dried together with the fabric at a single temperature level of the dryer oven, which should be sufficiently high such that: 1) the fabric is dried; 2) the physical element is dried; 3) the physical element reaches the temperature required for the "puffing" of the printed shape. The temperature of the fabric and/or the printed element should not reach above 160° C. to prevent the overextension and rupture of the puff microcapsules, which would cause the collapse of the physical element and result in a severe reduction in height of the physical element as well as destroy the smooth surface of the physical element.

In another embodiment of the invention, a staged drying oven may be used, in which in the first stage the temperature is kept at 110-120° C. to allow for the fabric and the physical element to dry, while in a second stage the temperature is allowed to reach up to 150° C. to enable the "puffing" of the physical element to its maximum height while maintaining its integrity. Also here the temperature should not be allowed to exceed 150° C. to prevent the rupture of the physical element with a resulting reduction in height of the protrusion and a destruction of the smooth surface. These stages can also be combined into one continuous process.

In both embodiments discussed above, during the drying process the temperature is sufficiently high to allow activation of the fixating agent and to ensure that crosslinking of the polymer onto itself and onto the fabric is completed during this step. After leaving the dryer the product is finished and may be rolled and slit to size.

To summarize, the drying profile needs to address two main requirements. First the removal of water from the fabric and protrusion in order to dry the paste, and second, puffing of the protrusion to the desired height, by means of activating the puffing agent, which starts at a predetermined temperature. Heat energy needs to be supplied in the correct proportions during the dwell-time of the fabric in the dryer to obtain optimum results. Alternatively a one-step drying process may be employed with a temperature sufficiently high to allow expansion of the microcapsules while at the same time drying the fabric and controlling the height of the physical element. A skilled person will easily devise the temperature–residence-time relationship needed for the desired processing. The puffing agent will typically be activated at a temperature of approximately 121-145° C. (puff products with different activation temperatures are also available and everything that is stated herein with regard to the puffing agent employed for the illustrative examples is applicable, mutatis mutandis, to other puffing agents by adjusting the temperature accordingly) and up to a limit of approximately 150° C., the amount of energy supplied to the puffing agent will determine the rate and extend of expansion and thus the ultimate height of the protrusion that will be obtained. Thus the drying temperature must be set such that the fabric will be dried and in addition, according to the desired height of the solid element.

As noted above, the maximum temperature the printed physical element may be exposed to is 150° C., so as not to cause rupture and with that, destruction of the physical element. However, since the dwell time of the printed fabric in the dryer system is short, at high manufacturing speeds, the temperature set point of the dryer may be significantly higher than 150° C., only to assure that the fabric and the printed physical element will reach temperatures of up to 150° C.

EXAMPLES

The following examples will describe the manufacturing process of the fabric of the invention and illustrate how the factors described above influence the control over the characteristics of the final product. In all examples the fabric is a non woven material manufactured by the hydroentanglement technique and may consist of different fiber compositions, i.e., a combination of absorbing fibers such as rayon and cotton, and non-absorbing fibers such as PET and PP. In all examples, the dots are printed using the In-Line Printing technology described in WO2004/071780 of the same applicant herein, although alternative systems may be employed. In this particular embodiment of the invention printing is done using a standard screen Printer (Stork BV, Holland), which is placed in the spunlace manufacturing line behind the water removing suction boxes and before the fabric reaches the dryers (i.e., the printing is done on fabric that is still wet), as described in the aforementioned WO2004/071780.

Example 1

Influence of the Solid Content of the Paste Formulation

A 60 gsm fabric was manufactured as described above with a fiber mixture of 30% Viscose and 70% PET and dots were printed onto the wet fabric using a screen printer as described above. The ink formulation, "Formulation A", is used for printing. The Basic Paste Formulation designated "Formulation A" is made up of two different acrylic copolymers supplied by BASF (Germany) (ACRONAL LN 579 S and ACRONAL S-537 S) 21.3% and 12.9% respectively; and a range of additives for various purposes: Urea (wetting agent, 0.75%); Diethylene Glycol (Processing Aid, 0.02%); Trimethyllopropane tris(2-methyl-1-aziridine-propionate (Cross-linking agent (0.4%); Polyethoxylated Fatty Alcohol C9-C11 (emulsifier and Rheology agent 0.16%); Polyethoxylated Stearyl Alcohol C16-C18 (Emulsifier and Rheology agent, 1.51%); Sodium Lauryl Sulfate (Emulsifier and Rheology Agent, 1.17%); Antifoam agents, including Polydimethyl Siloxane and Silica and Preserving Agents which may include Sodium Benzoate, Methyl-iso Thiazoline and Methyl-Chloro-iso-Thiazoline. The formulation is made up to the desired solid content by the addition of water.

This basic formulation was finalized through the addition of Puff microcapsules (Expancel 031WUFX 40, supplied by AKZO Nobel, Sweden) to a level of ~5% w/w. (which is ~11.5% by weight of polymer solids).

The viscosity of the formulation was adjusted with a rheology modifier (polyacrylic acid Ammonium salt (AVCO-CLEAR 150, supplied by AVCO Chemicals, Israel), to 4,000 cP (Measured at 60 rpm with a HAAKE Handheld Viscometer).

A specially developed screen was used: O.A. (Open Area, i.e., the percentage of area of the screen occupied by pores) 3.6%; thickness: 200 μm; pore size: 0.50 mm; WPV: 7.2. Three runs were made wherein the solid content of the printing ink varied from 43.3% solids, to 37.7 and then to 34.0%. In all three cases 4.3 gsm solids was deposited onto the fabric and adjustment to Puff concentration and viscosity were made to assure identical values in each run.

The dot characteristics are given in Table 1 below:

TABLE 1

| Sample No. | solid content (%) | Fabric Thickness (Micron) | Dot Size (mm) |
|---|---|---|---|
| 1 | (43.3) | 0.90 | 0.9 |
| 2 | (37.7) | 0.82-0.84 | 0.9-1.0 |
| 3 | (34.0) | 0.79 | 1.2 |

The solid content of the ink formulation directly affects the amount of material that is added to the fabric when the same screen (with the same print volume) is used. As shown above, when the same volume of material is deposited using formulations with a different solid content, the higher solid content will deposit higher amounts of material on the fabric and will result in a higher protrusion but less expanded (lower diameter). Thus, the solid content of the ink formulation may be used to regulate the amount of material deposited while using the same printing screen.

Example 2

Influence of the Rheology Profile and Thixotropy of the Paste Formulation

Table 2 shows the viscosity profiles of four different printing inks which have been employed in the different working examples.

All paste compositions are made up from Basic Formulation B. The Basic Paste Formulation designated Formulation B is made up of two different acrylic copolymers supplied by BASF (Germany) (ACRONAL LN 579 S and ACRONAL S-537 S) 21.3% and 12.9% respectively; A Puffing agent, polymeric microcapsules containing an expanding gas i.e., isobutane, supplier by AKZO Nobel (Sweden) (Expancel 031WUFX 40, 5%) and a range of additives for various purposes: Urea (wetting agent, 0.75%); Diethylene Glycol (Processing Aid, 0.02%); Trimethyllopropane tris(2-methyl-1-aziridine-propionate (Cross-linking agent (0.4%); Polyethoxylated Fatty Alcohol C9-C11 (emulsifier and Rheology agent 0.16%); Polyethoxylated Stearyl Alcohol C16-C18 (Emulsifier and Rheology agent, 1.51%); Sodium Lauryl Sulfate (Emulsifier and Rheology Agent, 1.17%); Antifoam agents, including Polydimethyl Siloxane and Silica and Preserving Agents which may include Sodium Benzoate, Methyl-iso Thiazoline and Methyl-Chloro-iso-Thiazoline. The solid content of the Formulation may be modified by addition of water. The standard solid content is 42.8% w/w.

The viscosity of these four samples was adjusted by variations in the amount of rheology modifier added and the overall viscosity was brought up using Polyacrylic Acid ammonium Salt (AVCOCLEAR 150, supplied by AVCO Chemicals, ISRAEL)

TABLE 2

| Sample Number | 57 | 62 | 59 | 61 |
|---|---|---|---|---|
| Solid Content | 35.0 | 34.9 | 35.4 | 40.3 |
| Low-Shear Visc. (1 rpm) | 31,000 | 45,000 | 70,000 | 110,000 |
| Medium-Shear Visc. (50 rpm) | 5,500 | 5,500 | 5,500 | 5,800 |
| High-Shear Visc. (100 rpm) | 4,000 | 3,150 | 3,150 | 3,800 |
| Thixotropy Ratio (1 rpm/50 rpm) | 5.6 | 8.2 | 12.7 | 19.0 |

The viscosity measurements were performed using a Brookfield Rotary Viscometer. In the examples below, a printing screen CP10 was used with a pore size of 0.55 mm.

Example 2A

A 59 gsm fabric was manufactured as described above with a fiber mixture of 50% Viscose and 50% PET and dots were printed onto the wet fabric using a screen printer as described above. The ink formulation 57 with the above given rheology profile was used for printing. The dots printed had a size (diameter) of 1.2-1.3 mm and the fabric thickness was 0.71

Example 2B

A 59 gsm fabric was manufactured as described above with a fiber mixture of 50% Viscose and 50% PET and dots were printed onto the wet fabric using a screen printer as described above. The ink formulation 62 with the above given rheology profile was used for printing. The dots printed had a size (diameter) of 1.0 mm and the fabric thickness was 0.74.

Example 2C

A 59 gsm fabric was manufactured as described above with a fiber mixture of 50% Viscose and 50% PET and dots were printed onto the wet fabric using a screen printer as described above. The ink formulation 59 with the above given rheology profile was used for printing. The dots printed had a size (diameter) of ~1.0 mm and the fabric thickness was 0.75.

Example 2D

A 59 gsm fabric was manufactured as described above with a fiber mixture of 50% Viscose and 50% PET and dots were printed onto the wet fabric using a screen printer as described above. The ink formulation 61 with the above given rheology profile was used for printing. The low-shear viscosity is too high and no printing could be done.

The results obtained in examples 2A-2D are summarized in Table 3 below.

TABLE 3

| Formulation (Thixotropy ratio) | Screen | Dot Size (Diameter) | Fabric Thickness | Material Deposited (gsm) |
|---|---|---|---|---|
| 57 (05.6) | CP10/0.55 | ~1.3 mm | 0.71 mm | 2.1 |
| 62 (08.2) | CP10/0.55 | ~1.1 mm | 0.74 mm | 2.1 |
| 59 (12.7) | CP10/0.55 | ~1.0 mm | 0.75 mm | 2.1 |
| 61 (19.0) | CP10/0.55 | — | — | — |

The results clearly show that the increased thixotropy ratio contributes to a smaller dot with a bigger height. However, both low-shear viscosity and high-shear viscosity should be maintained in a specific range to assure proper operation of the printing process.

Example 3

Influence of the Drying Temperature

In the examples below, the effect of temperature in the dryer on the dot characteristics can be appreciated.

A 55 gsm fabric was manufactured using standard Spunlacing technology fiber mixture of 40% Viscose and 60% PET and dots were printed onto the finished but not dried fabric using a screen printer as described above. The ink formulation used for printing consisted of the following ingredients:

Formulation B: 200 Kg

Blue NWB: 1.5 Kg (Copper Phtalocyanine Blue, Alpha Form)

Water: 6.0 Kg

AVCOCLEAR 150: 0.5 Kg (Polyacrylic Acid ammonium Salt)

This formulation has a solid content of 38.9% and a viscosity of 2,900 cP (at 60 rpm), as measured with a Haake handheld viscometer. Five samples were run with this printing ink, with increasing temperature of the dryer: 112, 127, 141, 156 and 171° C. respectively. The basis fabric (without print) has a weight of 49.2 gsm and a thickness of 0.56 mm. For printing, a CP30/0.50/200 screen (manufactured by the Stork Co., Austria) was used, the Line speed (printing speed) was set at 71.6 m/min. Samples were collected of all five printing runs and dot height and dot diameter were measured. The results are reported in Table 4 below:

TABLE 4

| Sample Number | 4 | 5 | 6 | 7 | 8 |
|---|---|---|---|---|---|
| Dryer Temperature (° C.) | 112 | 127 | 141 | 156 | 171 |
| Thickness (mm) | 0.70 | 0.77 | 0.79 | 0.79 | 0.76 |
| Dot Height (mm) | 0.14 | 0.21 | 0.23 | 0.23 | 0.20 |
| Dot Diameter (mm) | 0.9-1.0 | 1.0 | 1.0 | 1.0 | 1.0 |

The dryer temperature reaches an optimum at about 150° C., with maximum dot height, after which the dot height starts to decline. This is in keeping with the activation temperature of the Puff compound, which is between 121-145° C. The dot diameter does not change, indicating that the viscosity of the printing ink is such that the dot does not spread out after printing and the expansion is in the vertical direction only, while there is sufficient resistance from the fabric (as a result of the viscosity) that penetration is not increased and that expansion by the dots is directed outwards.

Example 4

Use of Different Line Speeds

A 55 gsm fabric was manufactured using standard Spunlacing technology fiber mixture of 40% Viscose and 60% PET and dots were printed onto the finished but not dried fabric using a screen printer as described above. The ink formulation used for printing consisted of the following ingredients:

Formulation B: 200 Kg

Blue NWB: 1.5 Kg

Water: 6.0 Kg

AVCOCLEAR 150: 0.5 Kg

This formulation has a solid content of 38.9% and a viscosity of 2,900 cP (at 60 rpm), as measured with a Haake handheld viscometer. Four samples were run with this printing ink, with increasing line Speed: 72.3, 93.8, 113.9 and 134.4 m/min. respectively. The basis fabric (without print) has a weight of 49.2 gsm and a thickness of 0.56 mm. For printing, a CP30/0.50/200 screen (manufactured by the Stork Co., Austria) was used, the Temperature of the Dryer was set at 140° C. Samples were collected of all four printing runs and dot height and dot diameter were measured. The results are summarized in Table 5 below:

TABLE 5

| Sample Number | 9 | 10 | 11 | 12 |
|---|---|---|---|---|
| Line Speed (m/min) | 72.3 | 93.8 | 113.9 | 134.4 |
| Thickness (mm) | 0.81 | 0.81 | 0.82 | 0.82 |
| Dot Height (mm) | 0.25 | 0.25 | 0.26 | 0.26 |
| Dot Diameter (mm) | 1.0 | 1.0 | 1.0 | 1.0 |

Nor the Dot Height nor the Dot Diameter are significantly affected by increasing line speeds. The printing process is stable and may be run at variable speeds according to needs.

Example 5

Use of Different Printing Screens

A non-woven fabric with fiber composition 50% PET and 50% Viscose, was manufactured using standard Spunlace techniques and dots were printed on the fabric in a random pattern before the non woven fabric was dried, using a screen printer and general technology as described above.

The fabric before printing had a weight of 53 gsm.

The screen printer was set up consecutively with three different screens, which have different pore density:

CP8: pores 0.50 mm; thickness 200 microns; Open Area: 1.9%; WPV: 3.8

CP12: pores 0.45 mm; thickness 200 microns; Open Area: 2.2%; WPV: 4.4

CP24: pores 0.45 mm; thickness 160 microns; Open Area: 4.3%; WPV: 6.9

The paste used was of Formulation B with AVCOCLEAR added to adjust the Viscosity (at 60 rpm) to 4,000 cP; Solid Content: 42.8%.

A single stage dryer was used which was set at 145° C.

Example 5a

Screen CP8

Printing was started at Add-On 6.0 $cm^3/m^2$ (volume of wet paste per square meter of fabric) (Which is ~2.4 gsm solids deposited onto the fabric and constitutes 159% of the Wet Paste Volume of the screen)) Fabric weight after printing: 55.5 gsm. The dots are well-developed and have significant height (approx 250 μm). Dot size: ~1.0 mm Example 5b Screen CP12

Printing was started at Add-On 7.0 $cm^3/m^2$ (volume of wet paste per square meter of fabric). (Which is ~2.8 gsm solids deposited onto the fabric which constitutes 159% of the Wet Paste Volume of the screen)) A good quality fabric is obtained and a roll was manufactured at these conditions. Fabric weight after printing: 56.0 gsm. The dots are well-developed and have significant height (approx. 250 μm). Dot size: ~1.0 mm Example 5c Screen CP24

Printing was started at Add-On 11.0 $cm^3/m^2$ (volume of wet paste per square meter of fabric). (Which is ~4.4 gsm solids deposited onto the fabric which constitutes 159% of the Wet Paste Volume of the screen)). Under these conditions a roll was manufactured. Fabric weight after printing: 56.2 gsm (Basis weight was reduced to 51 gsm for this product). The dots are well-developed and have significant height (approx. 250 μm). Dot size: ~1.0 mm Table 6 below gives the physical properties of the fabric obtained in the above example.

TABLE 6

| | | CP8 Screen | CP12 Screen | CP24 Screen |
|---|---|---|---|---|
| Strength MD Dry (N/5 cm) | | 132.7 | 140.3 | 144.7 |
| Strength MD Wet(N/5 cm) | | 138.0 | 133.0 | 149.1 |
| Strength CD Dry (N/5 cm) | | 31.9 | 33.5 | 33.3 |
| Strength CD Wet (N/5 cm) | | 37.4 | 37.2 | 36.6 |
| Elongation MD (%) | | 38.0 | 41.2 | 39.0 |
| Elongation CD (%) | | 103.2 | 110.4 | 116.0 |
| Weight (gsm) | Wet | 54.4 | 54.9 | 55.1 |
| | Dry | 52.4 | 52.8 | 52.6 |

TABLE 6-continued

| | | CP8 Screen | CP12 Screen | CP24 Screen |
|---|---|---|---|---|
| Thickness (mm) | | 0.85 | 0.84 | 0.85 |
| Wicking (mm/10 sec) | Machine Direction | 34.6 | 27.6 | 28.8 |
| | Cross Direction | 21.8 | 21.2 | 21.2 |
| Absorption (g/g) | | 9.8 | 9.8 | 10.2 |

Example 6

Use of Different Drying Processes

Example 6A

Multi-Stage Drying Process

A non-woven fabric with fiber composition 50% PET and 50% Viscose, was manufactured using standard Spunlace techniques and dots were printed on the fabric in a random pattern before the non woven fabric was dried, using a screen printer and general technology as described above. The fabric before printing had a weight of 55.5 gsm. A screen CP10 was used for printing: CP10: Pore size: 0.50; O.A. 2.3%; W.P.V.: 4.6 $cm^3/m^2$; thickness 200 μm. The paste used was of Formulation B with the following characteristics: Viscosity (at 60 rpm): 2,600 cP; Solid Content: 42.8%. The Line was run at a speed of 105 m/min. A multi-stage dryer was used with the following settings:

TABLE 7

| Dryer | Temperature (° C.) |
|---|---|
| Dryer 1: | 140 |
| Dryer 2: | 145 |
| Dryer 3: | 120 |
| Dryer 4: | 130 |
| Dryer 5: | 120 |
| Dryer 6: | 110 |

Printing was started at Add-On 6.0 $cm^3/m^2$ (volume of wet paste per square meter of fabric), which is 2.6 gsm solids deposited onto the fabric at a Wet Paste Volume of 130%. The printed dots were well-formed with a thickness of ~250 μm and a dot size of 0.9 mm. Note: The fabric moves through the oven segments in the following order: 6-5-4-1-2-3. Fabric weight after printing was 58.5 gsm. Table 8 below presents physical characteristics of the fabric manufactured. The two columns represent two different samples collected during the run.

TABLE 8

| Product Designation | | 13 | |
|---|---|---|---|
| Paste Formulation | | B | B |
| Strength MD (N/5 cm) (Wet) | | 131.9 | 136.6 |
| Strength CD (N/5 cm) (Wet) | | 39.2 | 39.4 |
| Elongation MD (%) (Wet) | | 34.2 | 36.8 |
| Elongation CD (%) (Wet) | | 111.4 | 94.6 |
| Weight (gsm) | Wet | 57.4 | 57.7 |
| | Dry | 55.2 | 55.4 |
| Thickness (mm) | | 0.78 | 0.79 |
| Wicking | MD | — | — |
| (mm/10 sec) | CD | — | — |
| Absorption (g/g) | | 9.6 | 9.7 |

Example 6b

Single-Stage Drying Process

A non-woven fabric with fiber composition 65% PET and 35% Viscose, was manufactured using standard Spunlace techniques and dots were printed on the fabric in a random pattern before the non woven fabric was dried, using a screen printer and general technology as described above. The fabric before printing had a weight of 85.0 gsm. A screen CP24 was used for printing: CP24/0.45: O.A. 4.3%; WPV 6.9 $cm^3/m^2$; Thickness 160 μm; Pore size 0.45 mm. The paste used was of Formulation B with the following characteristics: Viscosity (at 60 rpm): 4,000 cP; Solid Content: 42.8%.

A One-Stage dryer was used set at 140° C. The Line was run at a speed of 75 m/min. Printing was done at Add-On 15.0 $cm^3/m^2$ (volume of wet paste per square meter of fabric), which is 6.4 gsm solids deposited onto the fabric at a Wet Paste Volume of 217%. The printed dots were well-formed with a thickness of ~200 μm and a dot size of 1.0 mm. Fabric weight after printing was 91.0 gsm. Table 9 below presents physical characteristics of the fabric manufactured.

TABLE 9

| | | |
|---|---|---|
| Strength MD Dry (N/5 cm) | | 194.6 |
| Strength MD Wet(N/5 cm) | | 207.2 |
| Strength CD Dry (N/5 cm) | | 52.4 |
| Strength CD Wet (N/5 cm) | | 55.4 |
| Elongation MD (%) | | 42.0 |
| Elongation CD (%) | | 125.4 |
| Weight (gsm) | Wet | 89.6 |
| | Dry | 87.4 |
| Thickness (mm) | | 1.05 |
| Wicking | MD | 30.6 |
| (mm/10 sec) | CD | 87.4 |
| Absorption (g/g) | | 8.0 |
| Solids Deposited (gsm) | | 6.9 |

Example 7

The following are examples of the manufacturing process of non-woven fabric with physical elements (dots) printed on it.

Example 7a

A non-woven fabric with a basis weight of approx 46 gsm (gram per square meter) is manufactured with a fiber composition of 10% Rayon, 70% PET and 10% Cotton using the spunlace technology. Before the manufactured fabric is fed to the dryer, but after the suction boxes which remove significant amounts of water from the fabric, a screen printer is used to print a dot motif on the fabric, using a screen coded CP30 which has a thickness of 160 microns, pore size 0.45 mm. Open Area is 5.1% and the WPV of the screen is 8.16 $cm^3/m^2$. (manufactured by Stork, Austria). The printing ink used is of Formulation B with added white colorant (5% w/w) ($TiO_2$, which is supplied as a water-based paste of 70% solids by AVCO Chemicals, Israel). This brings the solid content of the printing ink to 43.7%. The viscosity was adjusted to 4,200 cP using AVCOCLEAR 150

Using this formulation 6.2 gsm solids was deposited on the fabric.

The height of the dot pattern obtained was approximately 350 microns.

Example 7b

A non-woven fabric with a basis weight of approx 55 gsm is manufactured with a fiber composition of 50% Rayon, 50% PET using the spunlace technology. Before the manufactured fabric is fed to the dryer, but after the suction boxes which remove significant amounts of water from the fabric, a screen printer is used to print a dot motif on the fabric, using a screen coded CP10 which has a thickness of 200 microns, pore size 0.45 mm. Open Area is 1.8% and the WPV is 3.6 $cm^3/m^2$. (manufactured by Stork)

The printing ink used is of Formulation B with added white colorant (5% w/w) ($TiO_2$, which is supplied as a water-based paste of 70% solids by AVCO Chemicals, Israel). This brings the solid content of the printing ink to 43.7%. The viscosity was adjusted to 3,000 cP using AVCOCLEAR 150.

Low Shear Viscosity (at 1 rpm) is 85,000 cP

Using this formulation 2.55 gsm solids was deposited on the fabric.

The height of the dot pattern obtained was approximately 350 microns.

Example 7c

A non-woven fabric with a basis weight of approx 64 gsm is manufactured with a fiber composition of 30% Rayon, 70% PET using the spunlace technology. Before the manufactured fabric is fed to the dryer, but after the suction boxes which remove significant amounts of water from the fabric, a screen printer is used to print a Random Lines motif on the fabric, using a screen coded RL2/CH60 which has a thickness of 190 microns, pore size 0.313 mm. Open Area is 14.76% and the WPV is 9.04 $cm^3/m^2$ (manufactured by Stork.)

The printing ink used is of Formulation B with added blue colorant (0.8% w/w) Copper Phtalocyanine Blue, Alpha Form). This brings the solid content of the printing ink to ~40.4%. The viscosity was adjusted to 3,800 cP using AVCOCLEAR 150

Using this formulation 6.5 gsm solids was deposited on the fabric.

The height of the dot pattern obtained is approximately 300 microns.

Example 8

Study of Particle Morphology

Example 8a

Using the process of Example 2c a fabric was manufactured and was then analyzed using electron microscopy. FIGS. 1 and 2 are Electron Microscopy Scans of a sample designated 59. FIGS. 1A through 1D are pictures of the surface of the sample, taken at different magnifications, as indicated in each figure. The "dot" is indicated by numeral 100 in FIG. 1A. The figures show the holes in the surface of the particle where gas has escaped during the puffing stage.

FIG. 2 is a cross-section of the dot of FIG. 1, taken along the A-A plane of FIG. 1A, again at different magnifications, as indicated on each figure. As can be seen in the figures the polymer that makes up the dot has penetrated the non-woven fabric, thus securely attaching itself to it.

Example 8b

Another sample was made using the process of Example 7c, and then it was analyzed using electron microscopy. FIGS. 3 and 4 are Electron Microscopy Scans of a sample designated 64. FIGS. 3A through 3D are pictures of the surface of the sample, taken at different magnifications, as indicated in each figure. The "dot" is indicated by numeral 300 in FIG. 3A. It can be seen in the figures that less holes appear in the surface of the particle where gas has escaped during the puffing stage, due to a gentler puffing process performed by maintaining a lower temperature during the process.

FIG. 4 is a cross-section of the dot of FIG. 3, taken along the B-B plane of FIG. 3A, again at different magnifications, as indicated on each figure. Here, again, and particularly in FIG. 4B, it is easy to see how the polymer that makes up the dot has penetrated the non-woven fabric, thus securely attaching itself to it.

Example 9

Effect of Puff Concentration as a Function of Total Amounts of Solids

A 55 gsm fabric was manufactured using standard Spunlacing technology: fiber mixture of 40% Viscose and 60% PET and dots were printed onto the finished but not dried fabric using a screen printer as described above. The ink formulation used for printing consisted of the following ingredients:

Formulation A: 200 Kg
Blue NWB: 1.5 Kg
Water: 5.5 Kg
AVCOCLEAR 150: 0.4 Kg

This formulation has a solid content of 38.6% and a viscosity of 3,100 cP (at 60 rpm), as measured with a Haake handheld viscometer.

Four samples were run with this printing ink, the first one with the ink as is, and thereafter after addition of increasing amounts of Puff compound (6.08, 11.47, and 16.23% respectively, based on the Solids in the formulation, which is approx. 2.5, 5, and 7.5% based on total formulation weight). The basis fabric (without print) has a weight of 49.2 gsm and a thickness of 0.56 mm.

For printing, a CP30/0.50/200 screen (manufactured by the Stork Co., Austria) was used, the Line speed (printing speed) was set at 72.8 m/min and the temperature of the dryer was set at 140° C. Samples were collected of all four printing runs and dot height and dot diameter were measured. The results are detailed in Table 10 below:

TABLE 10

| Sample | 14 | 15 | 16 | 17 |
|---|---|---|---|---|
| Puff Concentration (%) | 0 | 6.08 | 11.47 | 16.23 |
| Thickness (mm) | 0.56 | 0.66 | 0.74 | 0.85 |
| Dot Height (mm) | ~0 | 0.10 | 0.18 | 0.29 |
| Dot Diameter (mm) | 0.8-1.0 | 1.0 | 1.0 | 1.0 |

Figure 5:
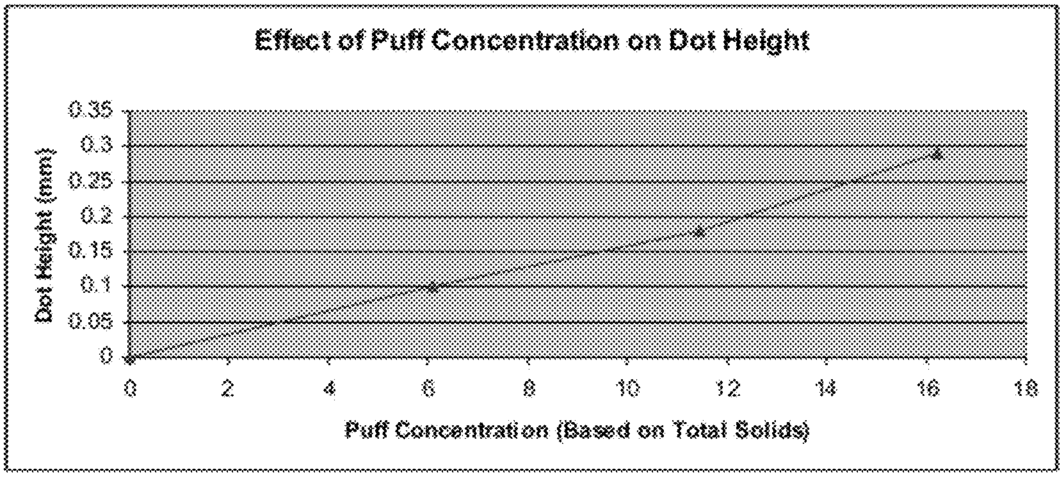
FIG. 5 is a graph summarizing the effect of puffing agent concentration on dot height.

As seen in FIG. 5, the dot height increases (almost) linearly with increasing Puff concentration, while the diameter of the dots remains unchanged. This experiment clearly shows that the Puff creates dot height and that this dot height increases linearly with the amount of puff in the printing ink. The dot diameter does not change, indicating that the viscosity of the printing ink is such that the dot does not spread out after printing and the expansion is in the vertical direction only, while there is sufficient resistance from the fabric (as a result of the viscosity) that penetration is not increased and that expansion by the dots is directed outwards.

Example 10

Effect of Dryer Temperature on Dot Height and Diameter

A 55 gsm fabric was manufactured using standard Spunlacing technology fiber mixture of 40% Viscose and 60% PET and dots were printed onto the finished but not dried fabric using a screen printer as described above. The ink formulation used for printing consisted of the following ingredients:

Formulation B: 200 Kg
Blue NWB: 1.5 Kg
Water: 6.0 Kg
AVCOCLEAR 150: 0.5 Kg

This formulation has a solid content of 38.9% and a viscosity of 2,900 cP (at 60 rpm), as measured with a Haake handheld viscometer.

Five samples were run with this printing ink, with increasing temperature of the dryer: 112, 127, 141, 156 and 171° C. respectively. The basis fabric (without print) has a weight of 49.2 gsm and a thickness of 0.56 mm. For printing, a CP30/0.50/200 screen (manufactured by the Stork Co., Austria) was used, the Line speed (printing speed) was set at 71.6 m/min. Samples were collected of all five printing runs and dot height and dot diameter were measured. The results are detailed in Table 11:

TABLE 11

| Sample | 18 | 19 | 20 | 21 | 22 |
|---|---|---|---|---|---|
| Dryer Temperature (° C.) | 110 | 125 | 140 | 155 | 170 |
| Thickness (mm) | 0.70 | 0.77 | 0.79 | 0.79 | 0.76 |
| Dot Height (mm) | 0.14 | 0.21 | 0.23 | 0.23 | 0.20 |
| Dot Diameter (mm) | 0.9-1.0 | 1.0 | 1.0 | 1.0 | 1.0 |

Figure 6:
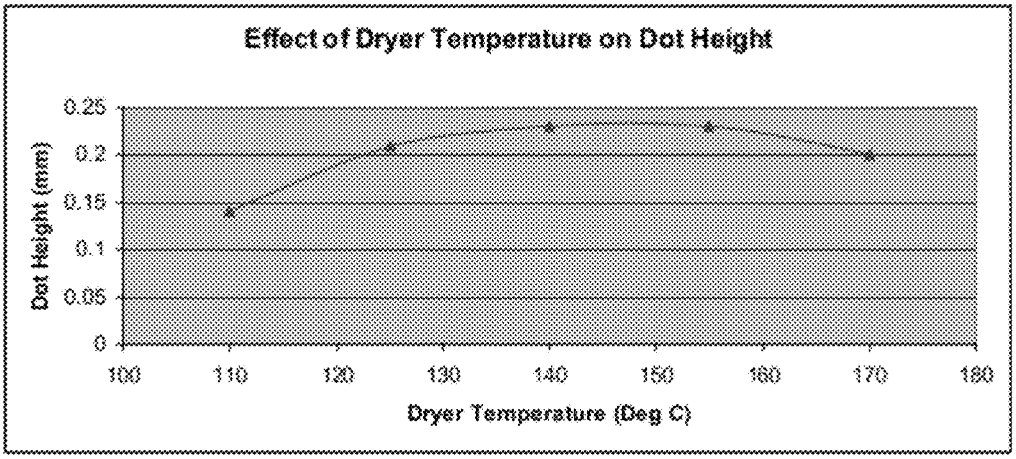
FIG. 6 is a graph summarizing the effect of drying temperature on dot height.

As shown in FIG. 6, the dryer temperature reaches an optimum at about 150° C., with maximum dot height, after which the dot height starts to decline. This is in keeping with the activation temperature of the Puff compound, which is between 121-145° C. The dot diameter does not change, indicating that the viscosity of the printing ink is such that the dot does not spread out after printing and the expansion is in the vertical direction only, while there is sufficient resistance from the fabric (as a result of the viscosity) that penetration is not increased and that expansion by the dots is directed outwards.

Example 11

The Effect of Line Speed on Dot Height and Dot Diameter

A 55 gsm fabric was manufactured using standard Spunlacing technology fiber mixture of 40% Viscose and 60% PET and dots were printed onto the finished but not dried fabric using a screen printer as described above. The ink formulation used for printing consisted of the following ingredients:

HDP-5: 200 Kg
Blue NWB: 1.5 Kg
Water: 6.0 Kg
AVCOCLEAR 150: 0.5 Kg

This formulation has a solid content of 38.9% and a viscosity of 2,900 cP (at 60 rpm), as measured with a Haake handheld viscometer.

Four samples were run with this printing ink, with increasing line Speed: 72.3, 93.8, 113.9 and 134.4 m/min. respectively. The basis fabric (without print) has a weight of 49.2 gsm and a thickness of 0.56 mm.

For printing, a CP30/0.50/200 screen (manufactured by the Stork Co., Austria) was used, the Temperature of the Dryer was set at 140° C. Samples were collected of all five printing runs and dot height and dot diameter were measured. The results are detailed in Table 12:

TABLE 12

| Sample Number | 23 | 24 | 25 | 26 |
|---|---|---|---|---|
| Line Speed (m/min) | 72.3 | 93.8 | 113.9 | 134.4 |
| Thickness (mm) | 0.81 | 0.81 | 0.82 | 0.82 |
| Dot Height (mm) | 0.25 | 0.25 | 0.26 | 0.26 |
| Dot Diameter (mm) | 1.0 | 1.0 | 1.0 | 1.0 |

Nor the Dot Height nor the Dot Diameter are affected by increasing line speeds. The printing process is stable and may be run at variable speeds according to needs.

Example 12

Effect of Viscosity on Dot Height and Diameter

A 55 gsm fabric was manufactured using standard Spunlacing technology fiber mixture of 40% Viscose and 60% PET and dots were printed onto the finished but not dried fabric using a screen printer as described above. The ink formulation used for printing consisted of the following ingredients:

VHA-4: 200 Kg
Blue NWB: 1.5 Kg
Water: 5.5 Kg
AVCOCLEAR 150: 0.4 Kg

This formulation has a solid content of 39.7%. The viscosity of this formulation is 2,100 cP (at 60 rpm).

Four samples were run with this printing ink, with increasing viscosity of the printing ink (achieved by adding increasing amounts of AVCOCLEAR 150) as measured at 60 rpm using a handheld Haake viscometer: 2,100, 3,300, 4,500 and 5,500 cP. The basis fabric (without print) has a weight of 49.2 gsm and a thickness of 0.56 mm.

For printing, a CP30/0.50/200 screen (manufactured by the Stork Co., Austria) was used, the Line speed (printing speed) was set at 72.3 m/min and the temperature of the dryer was set at 140° C. Samples were collected of all four printing runs and dot height and dot diameter were measured. The results are detailed in Table 13:

TABLE 13

| Sample Number | 27 | 28 | 29 | 30 |
|---|---|---|---|---|
| Viscosity (cP) | 2,100 | 3,300 | 4,500 | 5,500 |
| Thickness (mm) | 0.72 | 0.78 | 0.80 | 0.87 |
| Dot Height (mm) | 0.16 | 0.22 | 0.24 | 0.31 |
| Dot Diameter (mm) | 1.0 | 1.0 | 0.8-0.9 | 0.8-0.9 |

Figure 7:
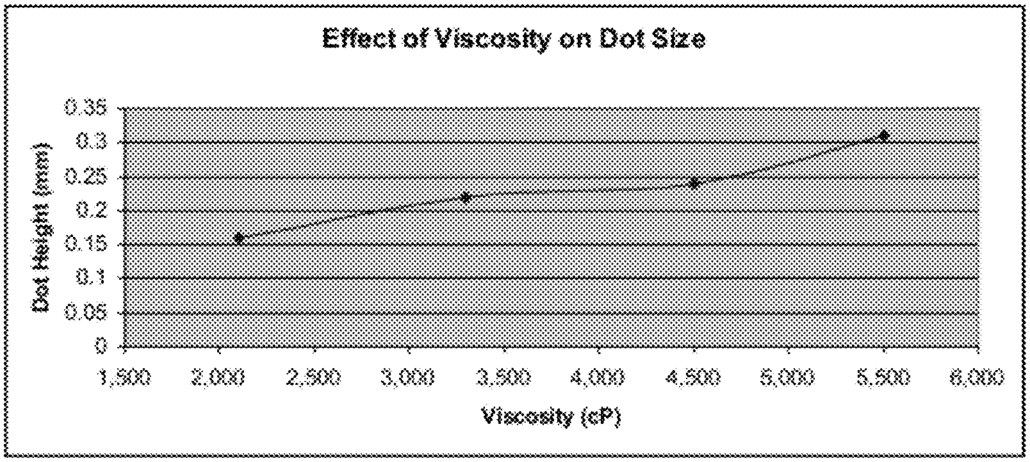
FIG. 7 is a graph summarizing the effect of viscosity of the ink on final dot size.

As seen in FIG. 7 the dot size decreases with increasing viscosity, which may be expected as the printed but wet dot will flow less at higher viscosity. The dot height increases with increasing viscosity since the printing ink is less and less capable of penetrating the fabric and all the puff effect is directed outward of the fabric.

All the above description and examples have been provided for the purpose of illustration and are not intended to limit the invention in any way. Many modifications and variations can be provided in the methods, operating conditions and components of the invention, without exceeding the scope of the claims.

The invention claimed is:

1. An in-line printing process for manufacturing a non-woven fabric having on its surface distributed elements having a physical dimension, comprising screen printing on a wet non-woven fabric a desired shape using a thixotropic paste formulation comprising a polymer, a surface tension modifier, and a puffing agent, said thixotropic paste formulation being characterized by a low shear viscosity, measured with a Brookfield rotary viscometer at speed of 1 rpm, of from 60,000 to 120,000 cP, and a high shear viscosity, measured with a Brookfield rotary viscometer at speed of 100 rpm, of below 2,000 cP.

2. A thixotropic paste formulation suitable for carrying out an in-line printing process on a wet non-woven fabric, comprising a polymer, a surface tension modifier, and a puffing agent, said thixotropic paste formulation being characterized by a low shear viscosity, measured with a Brookfield rotary viscometer at speed of 1 rpm, of from 60,000 to 120,000 cP, and a high shear viscosity, measured with a Brookfield rotary viscometer at speed of 100 rpm, of below 2,000 cP.

3. The thixotropic paste formulation of claim 2, which contains a rheology modifier.

4. The thixotropic paste formulation of claim 2, which has a medium shear viscosity, measured with a Brookfield rotary viscometer at 60 rpm, of from 1,500 to 5,000 cP.

5. The thixotropic paste formulation of claim 2, which contains a cross-linking agent.

6. The thixotropic paste formulation of claim 2, containing a total concentration of solid material of 15 to 45 wt %.

7. The thixotropic paste formulation of claim 2, which is characterized by a shape stability defined by a period of at least 5 minutes during which a drop of 1 $cm^3$ of paste dropped into 100 ml of water with no stirring maintains its integrity.

8. A non-woven fabric manufactured by the process of claim 1.

9. A non-woven fabric comprising abrasive or exfoliating elements on its surface, which are made of the paste formulation of claim 2.

10. The thixotropic paste formulation of claim 2, comprising (a) water;
(b) an acrylic co-polymer of styrene, butyl acrylate and acrylonitrile;
(c) an acrylic co-polymer of styrene, butyl acrylate, ethyl acrylate, and acrylic acid;
(d) one or more cross-linking agents;
(e) one or more rheology modifiers;
(f) one or more emulsifiers;
(g) conventional processing aids, additives and antifoam agents; and
(h) a puffing agent.

11. A thixotropic paste formulation suitable for carrying out an in-line printing process on a wet non-woven fabric, comprising a puffing agent and comprising, by weight:

(a) 55.0-85.0% of water;
(b) 10.0-35.0% of an acrylic co-polymer composed of the following monomers:
 (i) styrene (60-70%);
 (ii) butyl acrylate (25-35%);
 (iii) acrylonitrile (1-5%);
(c) 5.0-20.0% of an acrylic co-polymer composed of the following monomers:
 (i) styrene (25-35%);
 (ii) butyl acrylate (60-70%);
 (iii) ethyl acrylate (1-5%);
 (iv) acrylic acid (1-5%);
 (v) N-methylol acrylamide as a cross linking ingredient (1-3%);
(d) 0.2-1.0% of a polyacrylic acid ammonium salt thickener;
(e) 0.3-1.0% of urea;
(f) 0.0-0.5% of diethylene glycol;
(g) 0.1-0.5% of polyethoxylated fatty alcohol (C9-C11);
(h) 0.0-0.5% of polyethoxylated isotridecanol (C 13);
(i) 1.0-3.0% of polyethoxylated stearyl alcohol (C16-C18);
(j) 0.5-1.5% of sodium laurel sulfate;
(k) 0.0-0.5% of polydimethyl-siloxane;
(l) 0.0-0.3% of silica;

(m) 0.0-0.5% of oxidized aliphatic hydrocarbon;
(n) 0.1-0.5% of sodium benzoate;
(o) 0.0001% of methyl iso-thiazolinone;
(p) 0.0006% of methyl-chloro-iso-thiazolinone;
(q) 0.1-0.75% of trimethyllopropane tris-2-methyl-1-aziridine-propionate.

* * * * *